Feb. 9, 1932.  L. W. BARBER  1,843,940
ROLLER SIDE BEARING FOR CARS
Filed May 21, 1930   3 Sheets-Sheet 1
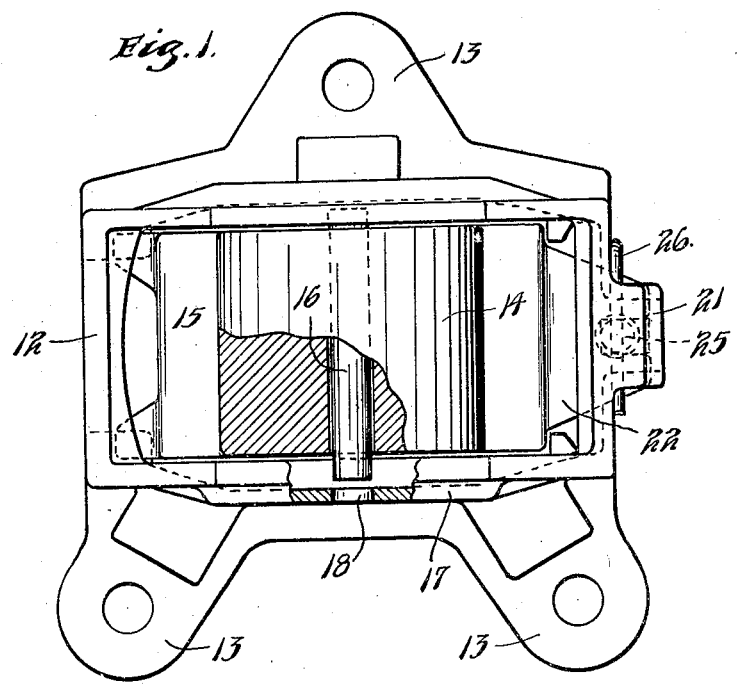
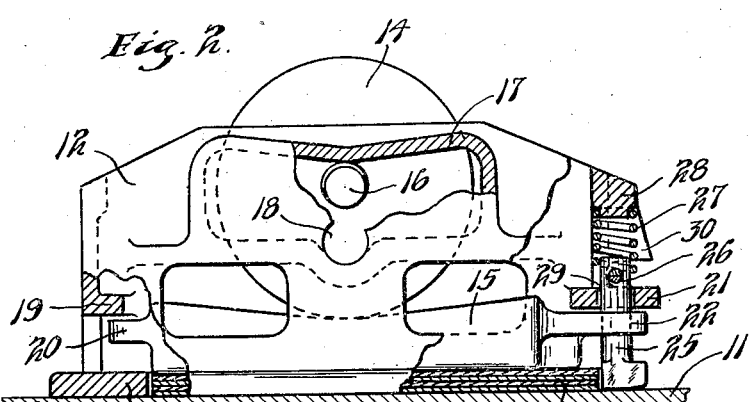
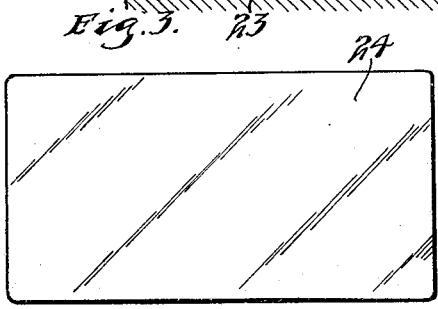
INVENTOR.
LEE W. BARBER.
BY HIS ATTORNEYS.

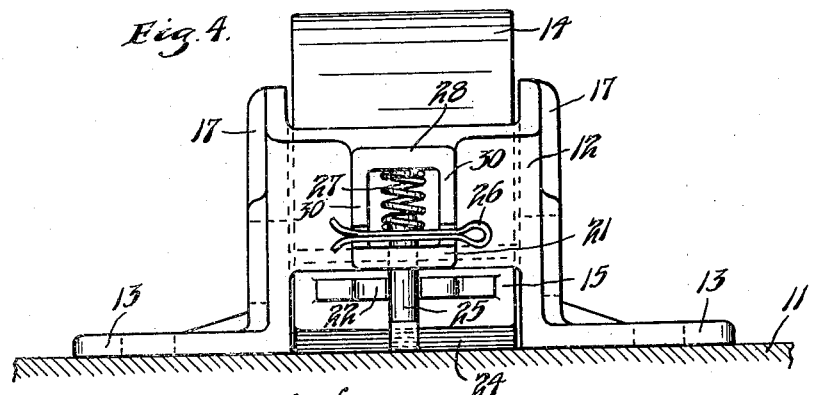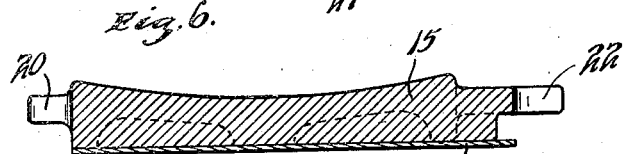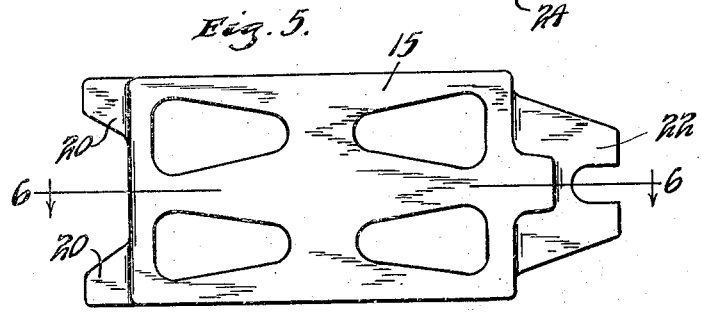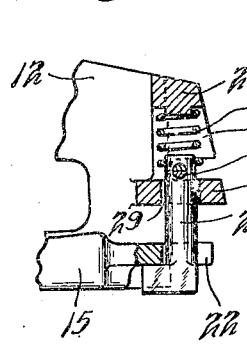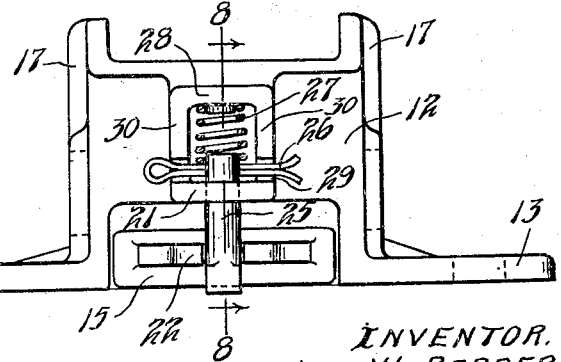

Feb. 9, 1932. L. W. BARBER 1,843,940
ROLLER SIDE BEARING FOR CARS
Filed May 21, 1930 3 Sheets-Sheet 3
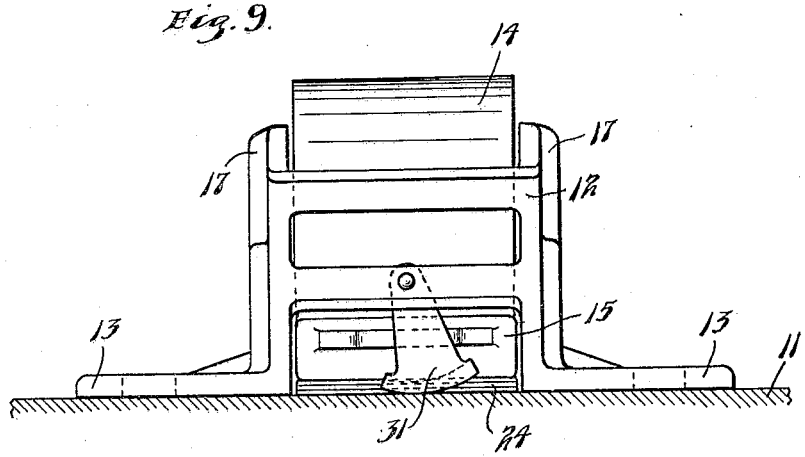
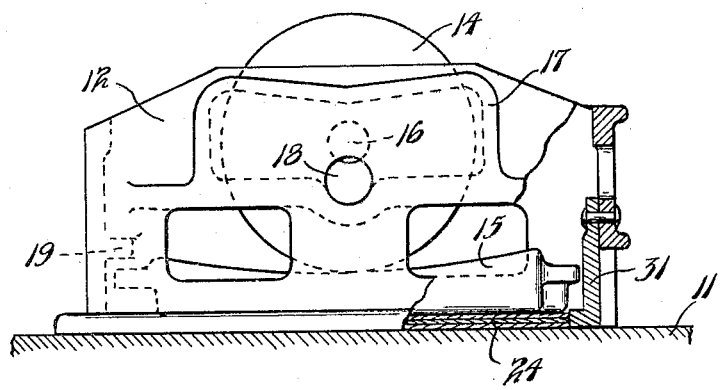
INVENTOR.
LEE W. BARBER.
BY HIS ATTORNEYS.

Patented Feb. 9, 1932

1,843,940

UNITED STATES PATENT OFFICE

LEE W. BARBER, OF CHICAGO, ILLINOIS, ASSIGNOR TO STANDARD CAR TRUCK CO., OF CHICAGO, ILLINOIS, A CORPORATION OF NEW JERSEY

ROLLER SIDE BEARING FOR CARS

Application filed May 21, 1930. Serial No. 454,304.

My invention has for its object to provide an improved roller side bearing for cars; and, to this end, my invention consists of the novel devices and combinations of devices hereinafter described and pointed out in the claim.

My invention, in its preferred form, and in one slight modification thereof, is illustrated in the accompanying drawings.

In said drawings, like notations refer to like parts throughout the several views.

Fig. 1 is a plan view of my improved roller side bearing with some portions broken away and others shown in horizontal section;

Fig. 2 is a view of the parts shown in Fig. 1, chiefly in front elevation, but partially in vertical section, with some portions broken away and the bearing device in position on the truck bolster with shims below the roller-tread plate;

Fig. 3 is a plan view of one of the shims detached;

Fig. 4 is a right end elevation of the parts shown in Fig. 2;

Fig. 5 is a bottom view of the roller-tread plate detached;

Fig. 6 is a longitudinal vertical section of the said roller tread plate on the line 6—6 of Fig. 5;

Fig. 7 is a right end elevation of the parts shown in Fig. 1, and most thereof also in Fig. 4, but with the adjustable retaining device in a different adjustment from that shown in Figs. 1 and 4;

Fig. 8 is a detail of some of the parts shown in Fig. 7 chiefly in vertical section on the line 8—8 of Fig. 7;

Fig. 9 is an end elevation of a slightly modified form of my improved roller side bearing for cars, the modification being in the form of the adjustable retaining device employed, and Fig. 10 is a view of the parts shown in Fig. 9 chiefly in side elevation but partly in vertical section with some parts broken away.

Having regard to the details of the structure, attention will first be directed to the preferred form of my device, as illustrated in Figs. 1 to 8, inclusive, although some of the same parts are also shown in Figs. 9 and 10.

The numeral 11, in Figs. 2, 4, 9 and 10, represents a portion of the car truck bolster. No other parts of the truck are illustrated. The numerals 12 and 13 represent respectively the body portion and the feet portions or bolt lugs of an open-topped and open bottomed housing which is adapted to be bolted in a rigidly fixed position at the proper point on the truck bolster 11. One of the end walls of the housing is also open at its lower portion, as clearly shown in Figs. 2, 4, 7, 8, 9 and 10 of the drawings; and this opening in the said end wall directly overlies the opening in the bottom of the housing. The numeral 14 represents the bearing roller and the numeral 15 the roller-tread plate for the same. The said roller 14 has a slightly enlarged axial bore as best shown in Fig. 2, in which is loosely mounted a retaining pin 16 of greater length than the axis of the roller. The inner profile faces of the sides of the body portion 12 of the housing are provided each with inwardly extending flanges 17 spaced apart from each other in the vertical plane, under which flanges the ends of the pins 16 project when the parts are in working position. The front side wall of the body portion 12 of the housing is provided with a pin passage 18 through which the pin 16 can be inserted into the roller 14 when the roller is in its lowermost position available before the roller-tread plate 15 is placed in the housing. Then when the said roller plate 15 is placed within the housing, the roller 14 will be raised up to such a height within the housing that the pin 16 cannot come into alignment with the pin passage 18 of the housing; and thereafter the roller can not be removed from the housing without first removing the said tread plate 15. The inwardly projecting flanges 17 on the profile faces of the body portion of the housing are at such height that the said roller and the said pin may receive a limited amount of vertical adjustment with the tread plate 15 without bringing the pin 16 into contact with the said flanges 17.

One of the vertical end walls of the body portion 12 of the housing is provided with an inwardly extending flange or rib 19 best shown in Fig. 2 and the corresponding end of the roller-tread plate 15 is provided with projecting lugs 20 adapted to engage under the rib 19 when the parts are in their assembled position, as clearly shown in Fig. 2. The opposite end wall of the housing is provided with a horizontal cross bar 21 and the corresponding end of the roller-tread plate 15 is provided with a notched projection 22 adapted to underlie the said cross bar 21 when the parts are in assembled position. The bottom portion of the said housing has an inwardly extending flange 23 which, when the parts are in working position, underlies the projecting lugs 20 of the roller-tread plate 15, as best shown in Fig. 2. The rib-flange 19 and the cross bar 21 of the said housing are disposed in the same horizontal plane and spaced apart far enough above the floor of the housing to permit the roller tread plate to have a limited vertical adjustment when in working position within the said housing.

If the said tread plate 15 is vertically adjusted within the body portion 12 of said housing, then the roller 14 will receive a similar adjustment. When the said tread plate 15 and roller 14 are adjusted upward beyond their lowermost position, one or more metallic shims 24, of the kind shown detached in Fig. 3, may be placed under the tread plate, as shown in Figs. 2, 4 and 9, for holding the said tread plate and roller in their adjusted positions. Likewise, if one or more shims have been placed under the roller tread plate 15, in order to raise the said tread plate and roller high enough to make the roller cooperate with the bearing on the car body bolster (not shown) and it should subsequently be desired to adapt the bearing to another car body bolster, one or more of the shims can be removed from under the roller-tread plate thus allowing the tread plate and roller to come down to a lower or their lowermost position in the housing. It is the opening in the bottom and one end wall of the housing which thus permits the shims to be applied directly to the face of the truck bolster underneath the roller tread plate 15, or removed therefrom without disturbing the housing. Of course, the adjustable retaining device 25, as shown in Figs. 1 to 8, inclusive, or 31, as shown in Figs. 9 and 10, must be adjusted out of the way when these shims are inserted or removed. The numeral 25, as best shown in Figs. 2, 4, 7 and 8, represents an adjustable retaining device carried by the body portion 12 of the housing, and which, in one of its adjusted positions, has a portion which is adapted to engage with the shims 24 when in working position under the roller tread-plate 15, as shown in Fig. 2 and thereby hold the said shims in their proper working position. The preferred form of this retaining device 25 is in the shape of an angular headed pin, the stem of which passes through the notch of the notched-lug 22 of the roller tread plate and the upper end of which passes through a hole in the cross bar 21 of the housing and is there engaged by a cotter 26 which holds the pin fast to the housing and is subject to a spring 27 reacting between the cotter 26 and the cross portion 28 in the body portion 12 of the housing, as best shown in Figs. 2, 4, 7 and 8. The angular head on the lower end of the said pin 25 projects laterally beyond the stem of the pin only at one side and when the parts are in the position shown in Figs. 1, 2 and 4, the back of the head of the pin will abut against the ends of the shims 24, for holding the shims in working position, but if the said pin 25 be adjusted into the position shown in Figs. 7 and 8, the laterally projecting part of the head of the pin 25 will be in position to engage under the notched lug 22 of the roller tread plate and thereby hold all the parts in their assembled position as is desired for storage and shipment. The spring 27 is not an absolute necessity as the pin 25 would tend to take and keep its lowermost position by gravity but the presence of the spring is desirable to insure that result, even if the pin got clogged in the service, by sand, dust or other impediment.

It must be obvious that the said pin 25 may be adjusted into either of its two desired positions, by simply rotating the pin in its bearings, after taking out the cotter 26, then replacing the cotter after the proper adjustment of the pin has been made. The said cotter 26 not only works through a hole near the top of the stem of the pin 25 but extends through holes 29 formed in vertical ribs 30 of the housing wall as clearly shown in Figs. 4 and 7; and hence it follows that the pin, having once been properly set, in either of its desired positions, will be there held by the cotter.

Having regard to the modification shown in Figs. 9 and 10 of the drawings, all the parts are the same with the exception of the adjustable retaining device for holding the assembled parts in their assembled position for storage or shipment, and for holding the shims in working position under the roller tread plate when the parts are in operative position on the truck bolster of the car. In this modification I employ, instead of an angular headed pin, a flanged sector 31 with its inner radial end pivoted to the adjacent end wall of the housing and its hook-like horizontal flange extended inward on the arc of the sector. When this sector is in the position shown in Figs. 9 and 10 the vertical face of the hook-shaped outer end of the sector 31 will abut against the ends of the shims 24 and hold the same in proper working position under the tread plate 15; but if no shims are present, as when the parts are assembled at the shop, the hook-like outer end of the sector 31 will engage under the notched lug 22 of the roller-tread plate and hold all the parts in their assembled position.

Especial attention is called to the fact that the vertical adjustment of the tread plate 15 and the roller 14 within the housing may be made without any disturbance of the housing, without dis-assembling any of the parts and without jacking up the car. So far as I know I am the first to have provided any roller side bearing for cars having these advantages. This is highly important, in the service, for the reason that it saves a lot of time and labor. Roller side bearings for cars should be vertically adjustable in order to meet the conditions present in the service. The body bolsters of cars get sprung in actual usage, from various causes, and it follows that a side bearing, when applied to the truck bolster of a given car, may not stand at the right height for the desired action in respect to the body bolster. Even truck bolsters will sometimes get sprung, in the service, and thus make vertical adjustment necessary for the adaptation of the side bearing to its proper use in that particular car. Steel castings employed in more or less of these side bearings, also sometimes get warped, so much that vertical adjustment of the roller is necessary in order to bring the side bearing into properly spaced relation in respect to the body bolster.

It, of course, will be understood that various changes may be made in the form, details, proportions and arrangement of the parts herein disclosed without departing from the scope of the applicant's invention which consists in the novel devices and combinations of devices herein disclosed and pointed out in the claim.

What is claimed is:—

In a roller bearing for cars, the combination with an open-topped housing, securable to the truck bolster, of a roller and a roller tread plate mounted in said housing, with freedom for common vertical adjustment thereof, by shims applicable under said plate or removable from that position, and an adjustable retaining device, carried by the housing, which, in one adjustment thereof, is adapted to hold said housing, roller and tread-plate in assembled position and which, in another adjustment thereof, is adapted to hold said shims in working position under said tread plate, substantially as described.

In testimony whereof I affix my signature.

LEE W. BARBER.